(12) United States Patent
Borisov et al.

(10) Patent No.: US 10,991,369 B1
(45) Date of Patent: Apr. 27, 2021

(54) COGNITIVE FLOW

(71) Applicant: Progress Software Corporation, Bedford, MA (US)

(72) Inventors: Hristo Borisov, Sofia (BG); Boyko Karadzhov, Sofia (BG); Ivan Atanasov, Sofia (BG); Georgi Varzonovtsev, Sofia (BG)

(*) Notice: Subject to any disclaimer, the term of this patent is extended or adjusted under 35 U.S.C. 154(b) by 204 days.

(21) Appl. No.: 16/264,036

(22) Filed: Jan. 31, 2019

Related U.S. Application Data

(60) Provisional application No. 62/624,594, filed on Jan. 31, 2018.

(51) Int. Cl.
| | |
|---|---|
| G10L 15/22 | (2006.01) |
| G06F 16/332 | (2019.01) |
| G06F 40/30 | (2020.01) |
| G06F 16/33 | (2019.01) |

(52) U.S. Cl.
CPC .......... *G10L 15/22* (2013.01); *G06F 16/3329* (2019.01); *G06F 16/3344* (2019.01); *G06F 40/30* (2020.01); *G10L 2015/223* (2013.01); *G10L 2015/225* (2013.01)

(58) Field of Classification Search
CPC .............. G10L 15/22; G10L 2015/223; G10L 2015/225; G06F 16/3329; G06F 16/3344; G06F 40/30
See application file for complete search history.

(56) References Cited

U.S. PATENT DOCUMENTS

| | | | | |
|---|---|---|---|---|
| 5,860,059 | A * | 1/1999 | Aust | G06F 3/16 704/231 |
| 6,233,561 | B1 * | 5/2001 | Junqua | G10L 15/1822 704/257 |
| 6,553,345 | B1 * | 4/2003 | Kuhn | H04N 21/482 704/275 |
| 6,829,603 | B1 * | 12/2004 | Chai | G06F 16/3344 |
| 7,729,919 | B2 * | 6/2010 | Wang | G06F 8/656 704/275 |

(Continued)

OTHER PUBLICATIONS

PlatzNov, Cheryl, There are a Dozen Ways to Order a Cofee. Why Do Dumb Bots Only Allow One?, https://medium.com/assist/thers-a-dozen-ways-to-order-a-cffee-why-do-dumb-bots-ony-allow-one-27230542636d, Nov. 13, 018, 4 pages.

(Continued)

*Primary Examiner* — Eric Yen
(74) *Attorney, Agent, or Firm* — Patent Law Works LLP

(57) ABSTRACT

A system and method obtaining structured information from a conversation including receiving a first input from a user, determining a first set of slots filled based on the first input using natural language processing and a non-linear slot filling algorithm, determining first conversation based on the first set of slots filled, determining a first empty slot associated with the first conversation, prompting the user for a second input, the second input associated with the first empty slot, filling the first empty slot using natural language processing and the non-linear slot filling algorithm, determining that the slots associated with the first conversation are filled; and, responsive to determining that the slots associated with the first conversation are filled, initiating an action associated with the conversation.

16 Claims, 8 Drawing Sheets

(56) References Cited

U.S. PATENT DOCUMENTS

| | | | | |
|---|---|---|---|---|
| 8,346,563 | B1* | 1/2013 | Hjelm | G10L 15/1822 704/275 |
| 9,558,740 | B1* | 1/2017 | Mairesse | G10L 15/08 |
| 10,418,033 | B1* | 9/2019 | Mutagi | G10L 15/30 |
| 10,475,451 | B1* | 11/2019 | Lynch | G10L 15/22 |
| 10,594,837 | B1* | 3/2020 | Dimascio | H04L 67/327 |
| 2001/0041980 | A1* | 11/2001 | Howard | G10L 15/1822 704/270 |
| 2003/0110037 | A1* | 6/2003 | Walker | G10L 13/027 704/257 |
| 2003/0225825 | A1* | 12/2003 | Healey | G06F 8/00 709/203 |
| 2004/0085162 | A1* | 5/2004 | Agarwal | G10L 15/22 333/196 |
| 2004/0193420 | A1* | 9/2004 | Kennewick | G06F 16/3329 704/257 |
| 2005/0033582 | A1* | 2/2005 | Gadd | G06Q 30/02 704/277 |
| 2006/0009973 | A1* | 1/2006 | Nguyen | H04M 3/4936 704/257 |
| 2006/0074670 | A1* | 4/2006 | Weng | G06F 40/295 704/257 |
| 2009/0055165 | A1* | 2/2009 | Jindal | G06F 40/56 704/9 |
| 2012/0065960 | A1* | 3/2012 | Iwama | G06F 40/211 704/9 |
| 2012/0173244 | A1* | 7/2012 | Kwak | G10L 15/22 704/275 |
| 2012/0323948 | A1* | 12/2012 | Li | G06F 16/3323 707/765 |
| 2014/0115456 | A1* | 4/2014 | White | G10L 15/22 715/708 |
| 2014/0222743 | A1* | 8/2014 | Baughman | G06F 40/205 706/46 |
| 2015/0095033 | A1* | 4/2015 | Boies | G10L 15/1815 704/257 |
| 2015/0142704 | A1* | 5/2015 | London | G06F 40/58 706/11 |
| 2017/0148073 | A1* | 5/2017 | Nomula | G06Q 30/0629 |
| 2017/0277993 | A1* | 9/2017 | Beaver | G06F 40/30 |
| 2018/0090141 | A1* | 3/2018 | Periorellis | G10L 15/1815 |
| 2018/0232376 | A1* | 8/2018 | Zhu | G06F 40/35 |
| 2018/0233141 | A1* | 8/2018 | Solomon | G06F 3/04842 |
| 2018/0308473 | A1* | 10/2018 | Scholar | A63F 13/00 |
| 2018/0336896 | A1* | 11/2018 | McGann | G06N 5/003 |
| 2018/0341395 | A1* | 11/2018 | Yaseen | G06Q 10/10 |
| 2018/0364798 | A1* | 12/2018 | Kingsbury | G06F 9/451 |
| 2018/0367669 | A1* | 12/2018 | Nicholson | G10L 15/222 |
| 2019/0005951 | A1* | 1/2019 | Kang | G10L 15/14 |
| 2019/0034795 | A1* | 1/2019 | Zitouni | G06F 16/90335 |
| 2019/0103101 | A1* | 4/2019 | Danila | G10L 15/1815 |
| 2019/0180338 | A1* | 6/2019 | Swanson | G06Q 30/0613 |
| 2019/0188056 | A1* | 6/2019 | Dimascio | G06F 40/35 |
| 2019/0214013 | A1* | 7/2019 | Meher | G10L 15/26 |
| 2019/0259500 | A1* | 8/2019 | Abou Mahmoud | G16H 10/20 |

OTHER PUBLICATIONS

Benefield, Ray (2018). RayBenefied/Moderator—An assistant in the building of declarative chatbots. JavaScript. Gifthub, webpage retrieved Dec. 7, 2016 from https://github.com/RayBenefield/moderator (Original work published 2016), 2 pgs.

Conversation Templates. Converse.ai, Webpage. Retrieved Sep. 5, 2016, from https://get.converse.ai/docs/conversation-templates, 1 pg.

Conversations. Converse.ai, Webpage. Retrieved Sep. 5, 2016, from https://get.converse.ai/docs/conversations, 1 pg.

Creating a dialog. (n.d.). Retrieved Oct. 2, 2017, from https://console.bluemix.net/docs/services/assistant/dialog-build.html#dialog-build.

Dialogs. API.AI. Webpage (Oct. 4, 2017). Retrieved Jun. 27, 2017, from https://web.archive.org/web/20171004235231/https://api.ai/docs/dialogs, 6 pgs.

How it works. Converse.ai, webpate. (Dec. 18, 2016). Retrieved Dec. 18, 2016, from Wayback Machine, https://web.archive.org/web/20161218193248/https://get.converse.ai/docs/getting-started.

Intents overview. API.AI, webpage. Retrieved Jul. 26, 2017, from https://dialogflow.com/docs/intents, 2 pgs.

Jrafsky, Dan, Conversational Agents, CS124/Linguiest 180 From Langues to Information, Stanford.edu, Chatbot PDF File, Retrieved online Feb. 21, 2016, from https://web.stanford.edu/class/cs124/lec/chatbot.pdf, 58 pgs.

Slot Filling. API.ai webpage, Retrieved Jun. 28, 2017, from Wayback Machine, https://web.archive.org/web/20170920122014/https://api.ai/docs/examples/slot-filling, 11 pgs.

Yuan, Michael, The conversational chatbox design challenge. IBM Web article, published Aug. 15, 2016, from https://web.archive.org/web/20160911004202/https://www.ibm.com/developerworks/library/cc-cognitive-chatbot-conversational-design/index.html, 4 pgs.

* cited by examiner

US 10,991,369 B1

COGNITIVE FLOW

CROSS-REFERENCE TO RELATED APPLICATIONS

This claims priority to and the benefit of U.S. Provisional Patent Application Ser. No. 62/624,594, filed Jan. 31, 2018, titled "Cognitive Flow," each incorporated herein by reference in its entirety.

FIELD OF INVENTION

The present disclosure relates to conversations between humans and computers. More specifically, the present disclosure relates to obtaining structured information from a conversation between a human and computer.

BACKGROUND

Present systems for obtaining structured information from a conversation between a human and computer (e.g. chatbot, artificial intelligence, digital assistant, etc.) rely on decision trees. Such systems require developers to build the decision trees using either code or a visual designer. Reliance on decision trees has drawbacks. For example, one drawback is that a developer is required to implement all possible paths and scenarios, which results in complicated nets of nodes, which are difficult to implement and maintain. Another example drawback is that interaction between the human and computer relies on the computer understanding the place in the complicated net of nodes that is the decision tree and navigating the same with natural language, which often results in conversations that are awkward and dissimilar from a conversation that would occur between two humans.

Present systems also fail to utilize analytics to determine what information to prompt the user for next in a conversation and to utilize information from a previous conversation to supply necessary information for a conversation.

SUMMARY

According to one innovative aspect of the subject matter in this disclosure, a system having one or more processors; and a memory storing instructions that, when executed by the one or more processors, cause the system to receive a first input from a user; determine a first set of slots filled based on the first input using natural language processing and a non-linear slot filling algorithm; determine first conversation based on the first set of slots filled; determine a first empty slot associated with the first conversation; prompt the user for a second input, the second input associated with the first empty slot; fill the first empty slot using natural language processing and the non-linear slot filling algorithm; determine that the slots associated with the first conversation are filled; and, responsive to determining that the slots associated with the first conversation are filled, initiate an action associated with the conversation.

In general, another innovative aspect of the subject matter described in this disclosure may be embodied in methods that include receiving, using one or more processors, a first input from a user; determining, using the one or more processors, a first set of slots filled based on the first input using natural language processing and a non-linear slot filling algorithm; determining, using the one or more processors, a first conversation based on the first set of slots filled; determining, using the one or more processors, a first empty slot associated with the first conversation; prompting, using the one or more processors, the user for a second input, the second input associated with the first empty slot; filling, using the one or more processors, the first empty slot using natural language processing and the non-linear slot filling algorithm; determining, using the one or more processors, that the slots associated with the first conversation are filled; and, responsive to determining that the slots associated with the first conversation are filled, initiating, using the one or more processors, an action associated with the conversation.

Other implementations of one or more of these aspects include corresponding systems, apparatus, and computer programs, configured to perform the actions of the methods, encoded on computer storage devices.

These and other implementations may each optionally include one or more of the following features. For instance, the user is human, the input is one or more of an audio input received via a microphone and a textual input, the first set of slots is common to a plurality of conversations and determining the first conversation is based on predictive analytics, wherein the predictive analytics is based on one or more of the user's individual history and a collective user history. For instance, the operations further include determining a second empty slot associated with the first conversation; and wherein the user is prompted for the second input associated with the first empty slot prior to being prompted for a third input associated with a second empty slot based on one or more of predictive analytics, where in the predictive analytics is based on one or more of the user's individual history and a collective user history, and a conditionality defined during development of the first conversation. For instance, the operations further include prior to determining that the slots associated with the first conversation are filled, receiving a third input from the user; determining that the third input is associated with a second conversation; storing information that fills slots associated with the first conversation; switching to the second conversation; filling a slot associated with the second conversation based on the third input using the natural language processing and the slot filling algorithm; and resuming the first conversation by prompting the user for the second input. For instance, the operations further include filling a slot associated with the first conversation based on input received from the user in a previous session. For instance, the operations further include receiving, during training, via a declarative framework, a name and a look-up strategy, the look-up strategy defining a search strategy of the natural language processing, wherein the look-up strategy is based on a trait; and receiving, during training, a first set of expressions. For instance, the operations further include receiving, during training, via a declarative framework, a name and a look-up strategy, the look-up strategy defining a search strategy of the natural language processing, wherein the look-up strategy is based on a keyword; and receiving, during training, via a declarative framework, a first set of words identifying a value for a slot associated with the first conversation, wherein the first set of words includes a plurality of synonyms for the value of the entity. For instance, the operations further include receiving, during training, via a declarative framework, a name and a look-up strategy, the look-up strategy defining a search strategy of the natural language processing, wherein the look-up strategy is based on a regex; and receiving, during the training, via a declarative framework, a definition of a pattern of the value of a slot associated with the first conversation.

It should be understood that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
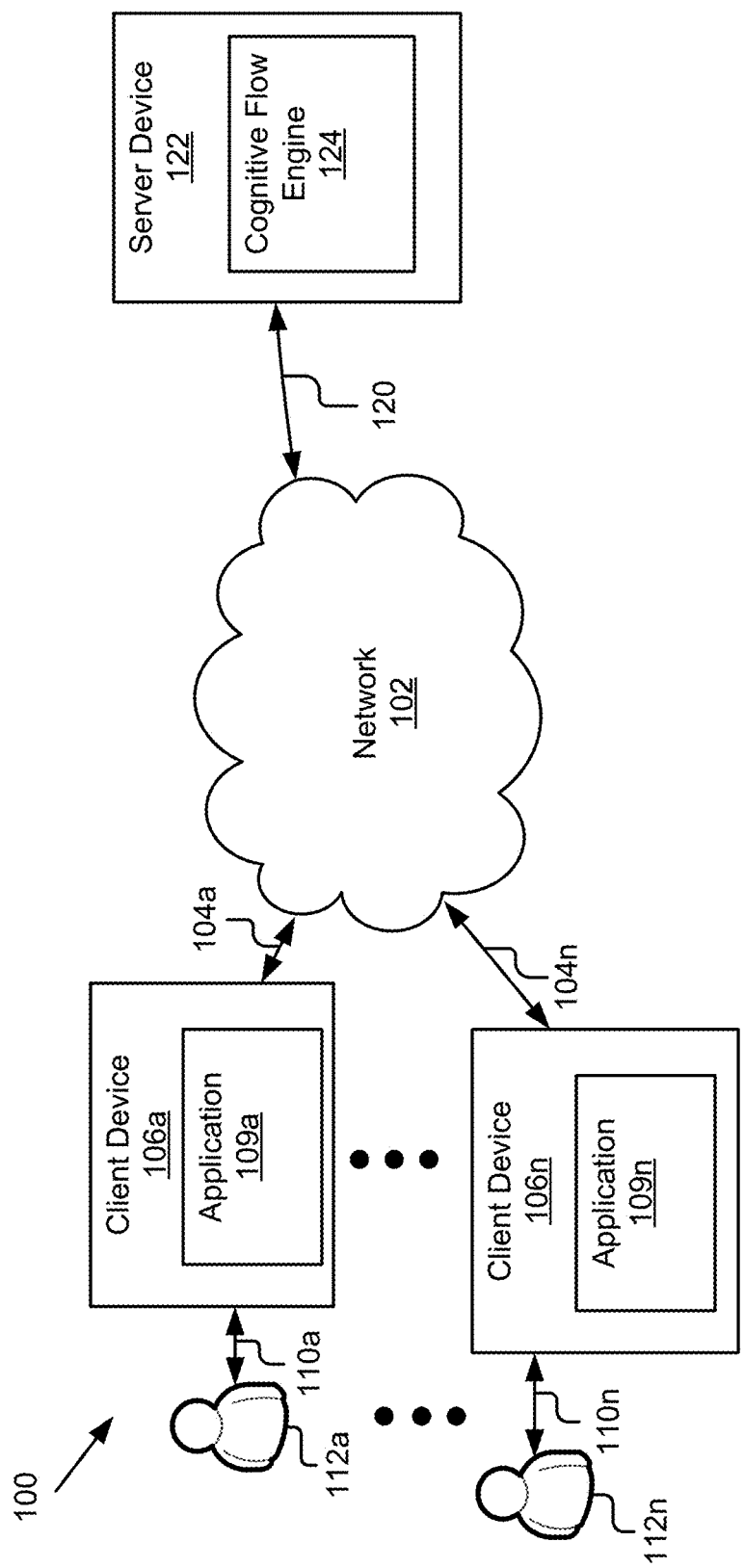
FIG. 1 is a block diagram illustrating an example system for cognitive flow according to one embodiment.

FIG. 1 is a block diagram illustrating an example system 100 for cognitive flow according to one embodiment. The illustrated system 100 includes client devices 106a . . . 106n, and a server device 122, which are communicatively coupled via a network 102 for interaction with one another. For example, the client devices 106a . . . 106n (also referred to individually and collectively as 106) may be respectively coupled to the network 102 via signal lines 104a . . . 104n and may be accessed by users 112a . . . 112n (also referred to individually and collectively as user 112) as illustrated by lines 110a . . . 110n. The server device 122 may be coupled to the network 102 via signal line 120. The use of the nomenclature "a" and "n" in the reference numbers indicates that any number of those elements having that nomenclature may be included in the system 100.

The network 102 may include any number of networks and/or network types. For example, the network 102 may include, but is not limited to, one or more local area networks (LANs), wide area networks (WANs) (e.g., the Internet), virtual private networks (VPNs), mobile networks (e.g., the cellular network), wireless wide area network (WWANs), Wi-Fi networks, WiMAX® networks, Bluetooth® communication networks, peer-to-peer networks, other interconnected data paths across which multiple devices may communicate, various combinations thereof, etc. Data transmitted by the network 102 may include packetized data (e.g., Internet Protocol (IP) data packets) that is routed to designated computing devices coupled to the network 102. In some implementations, the network 102 may include a combination of wired and wireless (e.g., terrestrial or satellite-based transceivers) networking software and/or hardware that interconnects the computing devices of the system 100. For example, the network 102 may include packet-switching devices that route the data packets to the various computing devices based on information included in a header of the data packets.

The data exchanged over the network 102 can be represented using technologies and/or formats including the hypertext markup language (HTML), the extensible markup language (XML), JavaScript Object Notation (JSON), Comma Separated Values (CSV), etc. In addition, all or some of links can be encrypted using conventional encryption technologies, for example, the secure sockets layer (SSL), Secure HTTP (HTTPS) and/or virtual private networks (VPNs) or Internet Protocol security (IPsec). In another embodiment, the entities can use custom and/or dedicated data communications technologies instead of, or in addition to, the ones described above. Depending upon the embodiment, the network 102 can also include links to other networks.

The client devices 106 are computing devices having data processing and communication capabilities. While FIG. 1 illustrates two client devices 106, the present specification applies to any system architecture having one or more client devices 106. In some embodiments, a client device 106 may include a processor (e.g., virtual, physical, etc.), a memory, a power source, a network interface, and may include other components whether software or hardware, such as a display, graphics processor, wireless transceivers, keyboard, camera, sensors, firmware, operating systems, drivers, various physical connection interfaces (e.g., USB, HDMI, etc.). The client devices 106a . . . 106n may couple to and communicate with one another and the other entities of the system 100 via the network 102 using a wireless and/or wired connection.

Examples of client devices 106 may include, but are not limited to, mobile phones (e.g., feature phones, smart phones, etc.), tablets, laptops, desktops, netbooks, server appliances, servers, virtual machines, TVs, set-top boxes, media streaming devices, portable media players, navigation devices, personal digital assistants, etc. While two or more client devices 106 are depicted in FIG. 1, the system 100 may include any number of client devices 106. In addition, the client devices 106a . . . 106n may be the same or different types of computing devices.

In the depicted implementation, the client devices 106a . . . 106n respectively contain instances 109a . . . 109n of an application 109 (also referred to individually and collectively as application 109). The application 109 may be storable in a memory and executable by a processor of a client device 106. In some embodiments, the client device 106 may include applications for making phone calls, video calls, messaging, social networking, gaming, capturing digital video, and/or images, authoring documents, etc. For clarity and convenience, unless otherwise indicated, application 109a refers to an application through which user 112a (e.g. a customer) interacts with a chatbot developed using the cognitive flow engine 124, and application 109n refers to an application through which user 112n (e.g. a developer) creates the chatbot using the cognitive flow engine 124. The applications 109a and 109n are not necessarily the same application or application type. For example, the application 109n used by the developer (e.g. user 112n) may be a web-browser or development application, and the application 109a used by the end user (e.g. 112a) conversing with the chatbot may be a social networking application (e.g. Facebook) where a company has embedded the chatbot in its corporate page.

The server device 122 may include one or more computing devices having data processing, storing, and communication capabilities. For example, the server device 122 may include one or more hardware servers, server arrays, storage devices, systems, etc., and/or may be centralized or distributed/cloud-based. In some implementations, the server device 122 may include one or more virtual servers, which operate in a host server environment and access the physical hardware of the host server including, for example, a processor, memory, storage, network interfaces, etc., via an abstraction layer (e.g., a virtual machine manager). In one embodiment, the server device 122 includes the cognitive flow engine 124 by with which a user 122n develops a chatbot and with which a user 112a interacts with the chatbot. In one embodiment, the server device 122 stores and accesses conversation data (not shown) in order to fill one or more slots (described below) or prompt a user to fill one or more slots (described below).

It should be understood that the system 100 illustrated in FIG. 1 is representative of an example system 100 for cognitive flow according to one embodiment and that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the system 100 may be integrated into to a single computing device or system or additional computing devices or systems, etc. For example, the cognitive flow engine 124 may be spread among multiple sets of server devices 122 (not shown) so that development/creation of a chatbot is associated with one set of "development" server devices 122, and use of the chatbot is associated with another set of "production" server devices 122.

Figure 2:
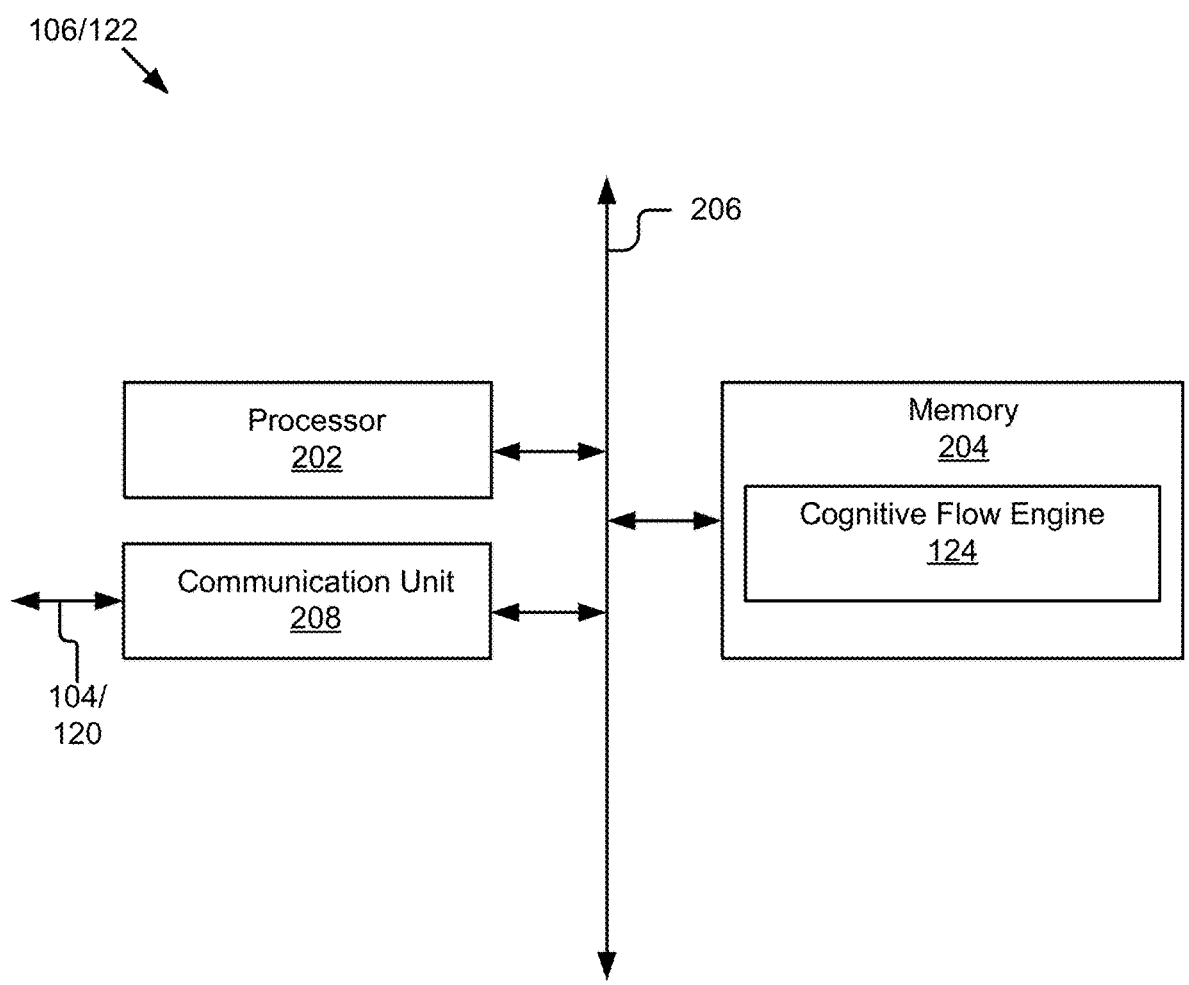
FIG. 2 is a block diagram illustrating an example computing device according to one embodiment.

FIG. 2 is a block diagram of an example computing device 106/122 according to one embodiment. The computing device 106/122, as illustrated, may include a processor 202, a memory 204 and a communication unit 208, which may be communicatively coupled by a communications bus 206. The computing device 106/122 depicted in FIG. 2 is provided by way of example and it should be understood that it may take other forms and include additional or fewer components without departing from the scope of the present disclosure. For example, while not shown, the computing device 106/122 may include a storage device, input and output devices (e.g., a display, a keyboard, a mouse, touch screen, speakers, etc.), various operating systems, sensors, additional processors, and other physical configurations. Additionally, it should be understood that the computer architecture depicted in FIG. 2 and described herein may be applied to multiple entities in a system 100, for example, the computing device 106/122 may be a client device 106 or a server device 122.

The processor 202 may execute code, routines and software instructions by performing various input/output, logical, and/or mathematical operations. The processor 202 have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single core or plurality of processing units and/or cores. In some implementations, the processor 202 may be capable of generating and providing electronic display signals to a display device (not shown), supporting the display of images, capturing and transmitting images, performing complex tasks including various types of feature extraction and sampling, etc. In some implementations, the processor 202 may be coupled to the memory 204 via the bus 206 to access data and instructions therefrom and store data therein. The bus 206 may couple the processor 202 to the other components of the computing device 106/122 including, for example, the memory 204 and communication unit 208.

The memory 204 may store and provide access to data to the other components of the computing device 106/122. In some implementations, the memory 204 may store instructions and/or data that may be executed by the processor 202. For example, in the illustrated embodiment, the memory 204 may store the cognitive flow engine 124. The memory 204 is also capable of storing other instructions and data, including, for example, an operating system, hardware drivers, other software applications, databases, conversation histories, user preferences, etc. The memory 204 may be coupled to the bus 206 for communication with the processor 202 and the other components of the computing device 106/122.

The memory 204 includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 202. In some implementations, the memory 204 may include one or more of volatile memory and non-volatile memory. For example, the memory 204 may include, but is not limited, to one or more of a dynamic random access memory (DRAM) device, a static random access memory (SRAM) device, a discrete memory device (e.g., a PROM, FPROM, ROM), a hard disk drive, an optical disk drive (CD, DVD, Blue-Ray™, etc.). It should be understood that the memory 204 may be a single device or may include multiple types of devices and configurations.

The bus 206 can include a communication bus for transferring data between components of a computing device 106/122 and/or between computing devices (e.g. between one or more of the client device 106, and server device 122), a network bus system including the network 102 or portions thereof, a processor mesh, a combination thereof, etc. In some implementations, the cognitive flow engine 124, its sub-components 302, 304, 306, 308, 310, and various other software operating on the computing device 106/122 (e.g., an operating system, etc.) may cooperate and communicate via a software communication mechanism implemented in association with the bus 206. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 208 may include one or more interface devices (I/F) for wired and/or wireless connectivity with the network 102. For instance, the communication unit 208 may include, but is not limited to, CAT-type interfaces; wireless transceivers for sending and receiving signals using radio transceivers (4G, 3G, 2G, etc.) for communication with the network 102, and radio transceivers for and close-proximity (e.g., Bluetooth®, NFC, etc.) connectivity, etc.; USB interfaces; various combinations thereof; etc. In some implementations, the communication unit 208 can link the processor 202 to the network 102, which may in turn be coupled to other processing systems. The communication unit 208 can provide other connections to the network 102 and to other entities of the system 100 using various standard network communication protocols.

As mentioned above, the computing device 106/122 may include other and/or fewer components. Examples of other components may include a display, an input device, a sensor, etc. (not shown). In one embodiment, the computing device 106/122 includes a display (not shown). The display may display electronic images and data for presentation to a user 112. The display may include any conventional display device, monitor or screen, including, for example, an organic light-emitting diode (OLED) display, a liquid crystal display (LCD), etc. In some implementations, the display may be a touch-screen display capable of receiving input from a stylus, one or more fingers of a user 112, etc. For example, the display may be a capacitive touch-screen display capable of detecting and interpreting multiple points of contact with the display surface.

The input device (not shown) may include any device for inputting information into the computing device 106/122. In some implementations, the input device may include one or more peripheral devices. For example, the input device may include a keyboard (e.g., a QWERTY keyboard or keyboard in any other language), a pointing device (e.g., a mouse or touchpad), microphone, an image/video capture device (e.g., camera), etc. In some implementations, the input device may include a touch-screen display capable of receiving input from the one or more fingers of the user 112. For example, the user 112 could interact with an emulated (i.e., virtual or soft) keyboard displayed on the touch-screen display by using fingers to contacting the display in the keyboard regions.

Example Cognitive Flow Engine 124

Figure 3:
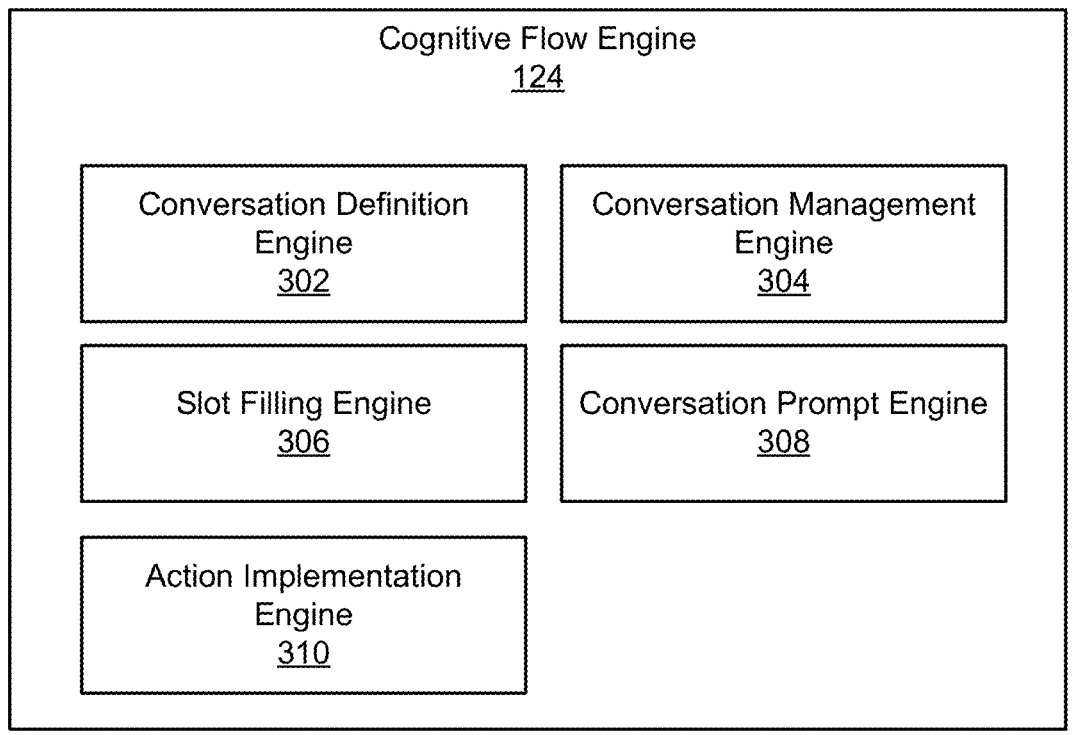
FIG. 3 is a block diagram illustrating an example cognitive flow engine 124 according to one embodiment.

Referring now to FIG. 3, an example of the cognitive flow engine 124 is shown in more detail according to one embodiment. FIG. 3 is a block diagram of the cognitive flow engine 124 included in the server device 122 according to one embodiment, which is illustrated in FIG. 1. In one embodiment, an engine (e.g., 124, 302, 304, 306, 308, 310) is a set of instructions executable by the processor 202. In another embodiment, an engine is stored in the memory 204 and is accessible and executable by the processor 202. In either embodiment, an engine is adapted for cooperation and communication with the processor 202, other components of the computing device 106/122 (e.g. other engines).

The cognitive flow engine 124 may provide various improvements over existing chatbots. For clarity and convenience, the description herein refers to "chatbots." However, unless otherwise indicated, the term chatbot(s) also includes conversation aspects associated with artificial intelligence (AI), digital assistants or any other system by which a user interacts conversationally with a computer. In one embodiment, the cognitive flow engine 124 provides a declarative (rather than imperative framework) for developing a chatbot, which simplifies the generation of a chatbot conversation and reduces or eliminates the need for coding. This may beneficially broaden the pool of potential chatbot developers (e.g. potentially eliminating the need for a data scientist). In one embodiment, the generation of the chatbot conversation is further simplified, as described below, by using a non-linear slot filling algorithm. In one embodiment, usage of the slot filling algorithm eliminates the use of decision trees and the complexity associated therewith. The non-linear nature of the slot filling algorithm may allow the chatbot to obtain and request information in different orders, for example, in whatever order a user supplies an initial set of information. The description also includes a system and method embodiment whereby the chatbot determines and prompts the user in an order determined by the chatbot (e.g. based on user preference, chatbot experience, etc.). In one embodiment, the cognitive flow engine 124 uses a chatbot memory, whereby the chatbot may pre-fill one or more slots based on a previous conversation with a user thereby expediting the conversation with the user.

In one embodiment, the cognitive flow engine 124 comprises a conversation definition engine 302, a conversation management engine 304, a slot filling engine 306, a conversation prompt engine 308, and an action implementation engine 310. As mentioned previously, depending on the embodiment, the engines 302, 304, 306, 308, 310 comprised in the cognitive flow engine 124 are not necessarily all on the same computing device 106/122. In one embodiment, the engines 302, 304, 306, 308, 310 and/or their functionality are distributed across multiple computing devices 106/122. For example, in one embodiment, the engines 302, 304, 306, 308, 310 are distributed across multiple server devices 122.

The conversation definition engine 302 includes code and routines for constructing a chatbot or the one or more conversations in which the chatbot participates when put into production. In one embodiment, the conversation definition engine 302 provides a declarative framework. The declarative framework may simplify and expedite the creation of chatbots. By using a declarative framework (e.g. describing what the conversation/chatbot should do) and relying on the cognitive flow engine 124 to fill slots, determine what slot to fill next, and what prompt to give, the chatbot itself and/or a new conversation may be brought to market 10-15 times more quickly than using an imperative framework (e.g. using a decision tree and describing how the conversation/chatbot should act step-by-step). In one embodiment, the declarative framework allows a developer (e.g. user 112n) to declaratively program a conversation using JavaScript Object Notation (JSON).

Figure 8:
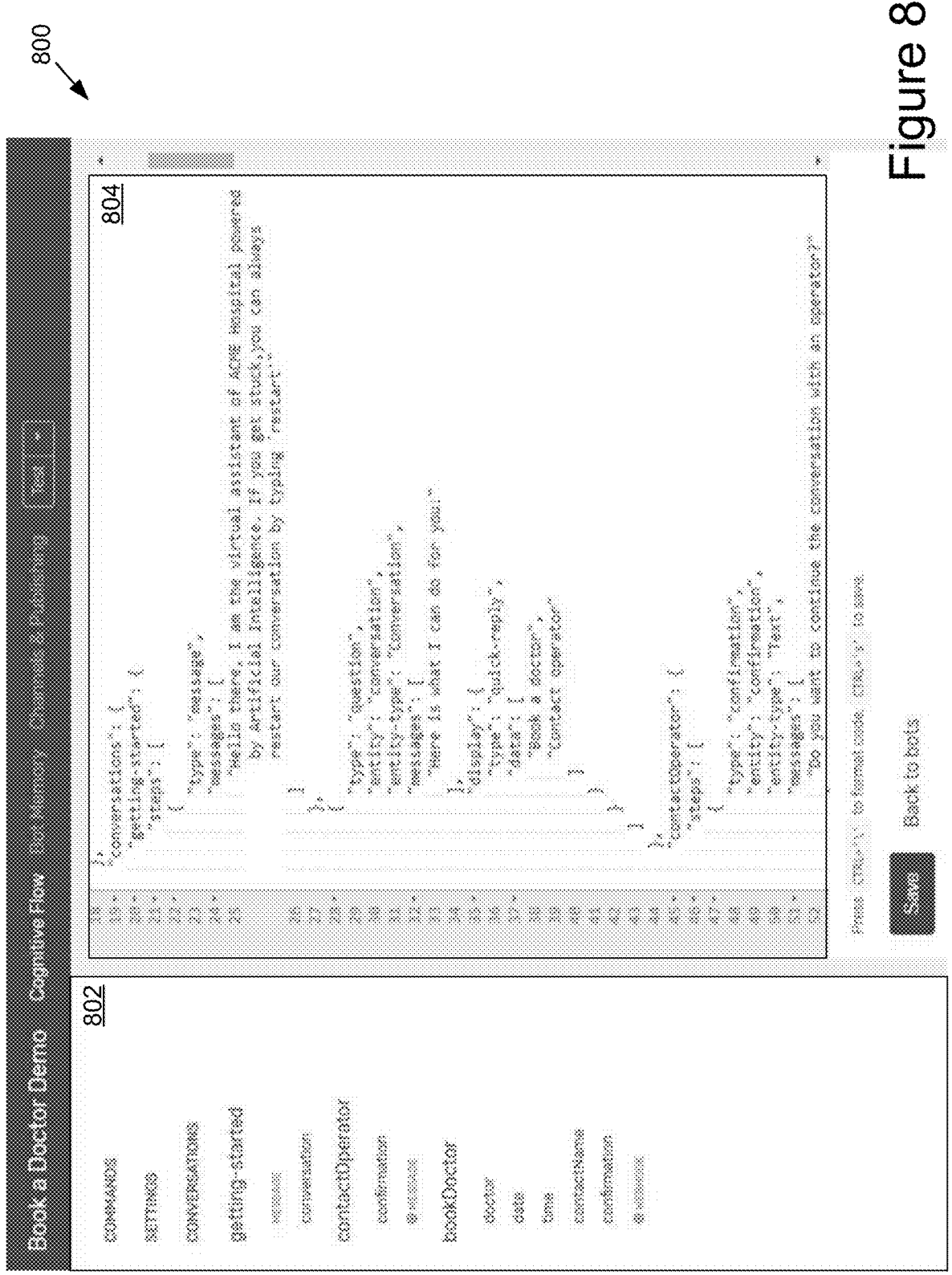
FIG. 8 is diagram illustrating an example user interface presented to a developer according to one embodiment.

Referring now to FIG. 8, FIG. 8 is diagram illustrating an example graphical user interface (GUI) presented to a developer (e.g. user 112n) according to one embodiment. In the illustrated GUI 800 of FIG. 8, a number of conversations (e.g. "getting-started," "contact operator" and "book doctor") have been created using JSON and the declarative framework via the conversation definition engine 124. It should be recognized that the illustrated embodiment is merely one example embodiment and different embodiments are within the scope of this description. For example, UIs that are formatted differently and/or define the conversation differently (e.g. using a format other than JSON) are within this disclosure.

In one embodiment, the conversation definition engine 302 receives inputs (e.g. a name) from a developer (e.g. user 112n) identifying a conversation, one or more slots for the conversation, optional conditionality for the one or more slots, one or more prompts for one or more slots associated with the conversation, and, optionally, one or more validations. For clarity and convenience, this description may refer to an example involving the medical field and a patient scheduling, modifying or canceling a doctor appointment at a clinic. It should be understood that this example is merely one example implementation selected for illustrative purposes and other implementations exist.

The conversation definition engine 302 receives input identifying a conversation, for example, a name of a conversation. The mechanism of input may vary depending on the embodiment. In one embodiment, the input is received from the user 112n via text entered into a field within a GUI the conversation definition engine 302 provides for presentation to user 112n. For example, the conversation definition engine 302 receives "Schedule Appointment" from a field in a GUI the conversation definition engine 302 provides for presentation to the user 112n. In another example, the conversation definition engine 302 receives text such as "getting-started," or "contactOperator" nested within "conversations," as illustrated at lines 20 and 45, respectively, in FIG. 8, by a user 112n selecting a location on the GUI and typing.

The conversation definition engine 302 receives input identifying one or more slots associated with the conversation. The mechanism of input may vary depending on the embodiment. In one embodiment, the input is received from the user with a GUI the conversation definition engine 302 provides for presentation to user 112n. For example, the conversation definition engine 302 may receive inputs identifying "doctor," "date," "time," and "contactName" as the slots representing the information needed to schedule, also known as "book" or "booking," an appointment. FIG. 8 illustrates that "doctor," "date," "time," and "contactName" are slots associated with the "bookDoctor" conversation the left column 802 of the GUI 800 of FIG. 8. Not shown is that if a user scrolled down in the right portion 804 of the GUI 800, those slots would be defined within a "bookDoctor" conversation using JSON according to the illustrated embodiment.

In some embodiments, the conversation definition engine 302 may optionally receive a conditionality for a slot explicitly from the user 112n. A conditionality may define a relative order for two slots. For example, a developer (e.g. user 112n) may require, for whatever reason, that an end user (e.g. 112a) provide one piece of information (e.g. slot 1) before another (e.g. slot 2). The conversation definition engine 302 may receive input defining the conditionality of slot 2 upon slot 1. In some embodiments, the conversation definition engine 302 may determine implicit conditionality for the one or more defined slots, for example, based on experience and machine learning.

The conversation definition engine 302 receives input defining a set of one or more prompts. In some embodiments, there are different types of prompts that may be defined within a conversation by a developer. Examples of types of prompts may include, but are not limited to, reactions and requests. Examples of reactions may include, but are not limited to, validations, ambiguities, acknowledgements, and confirmations.

A validation prompts a validation action. In one embodiment, the validation prompt causes the action implementation engine 310, discussed below, to perform a validation action. For example, assume the conversation is to book a doctor's appointment and after receiving the name of the doctor and a date, the defined validation prompt causes the action implementation engine 310 to check to see if that doctor is working that day. In another example, a prompt may cause a credit card validation when a credit card number is received, for example, the associated slot is filled.

An ambiguity prompt is a prompt to resolve an ambiguity. For example, assume there are two doctors with the last name "Smith," the ambiguity prompt may prompt the user to clarify whether they want to see Dr. Alex Smith or Dr. Brenda Smith. In some embodiments, an ambiguity prompt may not be explicitly defined by the developer (e.g. user 112n). For example, in some embodiments, the system 100, may automatically create an ambiguity prompt when a confidence level is too low or too close between two outcomes (e.g. the probability that the user 112a is referring to Dr. Alex Smith is close to the probability that the user 112a is referring to Dr. Brenda Smith).

An acknowledgement prompt is a prompt for the chatbot to acknowledge that a slot has been filled. For example, assume that after a customer (e.g. user 112a) states "I'd like to book an appointment with Dr. A Smith for 11 am," the chatbot, responsive to an acknowledgement prompt, returns an acknowledgement "Checking Dr. A. Smiths calendar for the next available appointment at 11 am," thereby acknowledging that a conversation as well as the slots for doctor and time have been determined and filled, respectively. In some embodiments, an acknowledgement prompt may not be explicitly defined by the developer (e.g. user 112n). For example, in some embodiments, the system 100, may automatically create acknowledgement prompts.

A confirmation prompt confirms the accuracy of information. In one embodiment, a confirmation prompt is sent based on the filling of the one or more slots. For example, a confirmation prompt may be sent to confirm after a slot is filled. For example, a confirmation may resemble "The doctor you'd like to see is Dr. A. Smith, is that correct?" In another example, a confirmation prompt may confirm accuracy when all the slots associated with a conversation are filled, but before a "goal" action (e.g. an appointment is cancelled, modified, or made) is performed. For example, a confirmation may resemble "Are you sure you want to cancel your appointment with Dr. A. Smith on Feb. 8, 2018?"

A request prompt is a prompt associated with a slot. In one embodiment, the request prompt is associated with a slot and the request prompt, when delivered to user 112a (e.g. a customer) prompts user 112a to provide the information required by the slot. For example, a prompt for a "Time" slot may be "For what time would you like the appointment?" and the prompt for a "Doctor" slot may be "Which doctor would you like to see?," which prompt user 112a to provide a time, thereby filling the "Time" slot, and a doctor's name, thereby filling the "Doctor" slot, respectively.

The conversation definition engine 302 may receive definitions for multiple conversations. For example, in addition to the above mentioned conversation for making an appointment, conversations for canceling an appointment, rescheduling an appointment, booking a follow-up appointment, rating a doctor or a visit, paying a bill for a visit, scheduling a test or procedure, etc. may be defined as additional conversations.

In some embodiments, the conversation definition engine 302 may receive definitions of multiple types of conversations. Types of conversations may include, but are not limited to, goal conversations, support conversations, and small talks.

In one embodiment, the conversation definition engine 302 may receive a definition of one or more small talk conversations, which are conversations that focus on small talk or social niceties. Examples of small talk or social niceties may be salutations such as a greeting, a goodbye, a thanks you, etc. In FIG. 8, the "getting-started" conversation is a small talk conversation and has the message "Hello there, I am the virtual assistant of ACME Hospital powered by Artificial Intelligence. If you get stuck, you can always restart or conversation by typing 'restart.'"

In one embodiment, the conversation definition engine 302 may receive a definition of one or more goal conversations, which are conversations that focus on achieving a goal. Examples of goals may include, but are not limited to, booking an appointment, canceling an appointment, rescheduling an appointment, making a payment, etc. In FIG. 8, the "bookDoctor" conversation is a goal conversation with the intended goal of the conversation being the scheduling of a doctor appointment.

In one embodiment, the conversation definition engine 302 may receive a definition of one or more support conversations, which are conversations that may support the achievement of the goal (e.g. by providing auxiliary information). For example, assume a goal conversation is to book an appointment, so the chatbot asks user 112a for what time the user 112a would like to make the appointment. The user 112a may not know the clinic's hours of operation and may ask "When are you open?" In one embodiment, this may initiate an hours of operation conversation in which the chatbot provides the clinic's hours of operation, which does not directly result in a time for the appointment to be scheduled, but provides auxiliary information that may be used by the user 112a in his/her decision making.

The conversation definition engine 302 generates a chatbot conversation based on the received conversation identifier(s), slot(s), optional condition(s), prompt(s), and optional validation(s). In one embodiment, the conversation definition engine generates a chatbot conversation that utilizes a slot filling algorithm (e.g. rather than decision tree(s)). In the illustrated embodiment of FIG. 3, the chatbot conversation generated by the conversation definition engine 302, provides the features and functionality described below with reference to engines 304, 306, 308, and 310. To summarize and simplify, the conversation definition engine 302 represents the development environment and engines 304, 306, 308 and 310 represent the production environment and features and functionality created via the conversation definition engine 302 and implemented in a chatbot.

The conversation management engine 304 includes code and routines for determining a conversation and switching between conversations. In some embodiments, the conversation management engine 304 determines a conversation explicitly based on natural language processing (NLP). For example, the conversation management engine 304 determines the "bookDoctor" conversation based on "I'd like to make a doctor appointment." In one embodiment, the NLP uses a trait lookup strategy to identify the meaning of the user's sentence as a whole in order to identify the appropriate conversation. For example, during development the conversation definition engine 302 receives input from a user 112n indicating that the trait lookup strategy is to be used for a value of a the "bookDoctor" conversation and a definition of one or more expressions provided by the user 112n, and the conversation management engine 304 and natural language processing use the expressions to identify the value. In one embodiment, the user 112n provides a set of expressions during development and the system 100 may modify the expressions during production based on machine learning the input received from users (e.g. user 112a) in production.

In some embodiments, the conversation management engine 304 determines a conversation based on one or more slots. For example, in one embodiment, the conversation management engine 304 maintains a conversational context that includes an inventory of all fields (e.g. slots) that have been extracted (e.g. filled) during the current user 112a session, and the conversation management engine 304 determines that the user has provided a doctor's name and a date, and predicts (e.g. from an inventory including conversation using those slots) that the user is most likely wanting to schedule an appointment and initiates the "bookDoctor" conversation as illustrated in the "Predicted steps" portion of FIG. 7.

The conversation management engine 304 handles conversation switching. For example, a switch from a goal conversation (e.g. booking an appointment) to a support conversation (e.g. regarding the cost of the appointment or the clinic's hours) and back to the goal conversation. In one embodiment, the conversation management engine 304 includes or utilizes a "short term" memory (e.g. a portion of memory 204) in which it stores information about the current session including information used to fill one or more slots (e.g. the inventory of fields (e.g. slots) that have been extracted (e.g. filled) during the current user 112a session. For example, the short term memory may store information for slots of conversation 1, so if/when conversation 1 is returned to, after another conversation (e.g. a different goal conversation or a support conversation), the chatbot need not obtain the information for those slots again to complete conversation 1. In another example, the conversation management engine 304 stores information for slots "Doctor" and "Date," which it receives after initiating the "bookDoctor" appointment, but user 112a input indicates that the user's actual intent is to cancel an appointment, so the conversation management engine 304 transitions the conversation to a "cancelDoctor" conversation and provides the information for "Doctor" and "Date" slots in that conversation. Such changes in conversations while preserving context are not available in existing systems utilizing decision trees.

The slot filling engine 306 includes code and routines for receiving user inputs, performing natural language processing on user input to extract information for filling a slot, and using a slot filling algorithm to fill slots.

The slot filling engine 306 performs natural language processing on input received from user 112a. The slot filling engine 306, using natural language processing, identifies information from user 112a input associated with a slot. For example, assume the slot filling engine 306 receives "I'd like an appointment with Dr. A at the North Clinic;" in one embodiment, the conversation management engine 304, using natural language processing, determines that conversation is "bookDoctor," and the slot filling engine 306 determines that Dr. A and North Clinic are associated with slots "doctor" and "clinic," respectively, and fills those slots with that information.

In some embodiments, the slot filling engine 306 may use a keyword lookup strategy or a regex lookup strategy to identify information associated with a particular slot of a conversation from input received from a user (e.g. user 112a) during a conversation. In one embodiment, a keyword lookup strategy is used if an entity can be identified by a specific word in a sentence. In some embodiments, that keyword and one or more synonyms for that keyword may be defined, via the conversation definition engine 302, during development (e.g. using the declarative framework). For example, a "Doctor" entity slot may use a keywords lookup strategy and a value such as "Dr. John Burke" may be defined as a value along with synonyms such as "Dr. Burke," "Dr. John Burke," etc. For example, during development the conversation definition engine 302 receives input from a user 112n indicating that the keywords lookup strategy is to be used for a "Doctor" entity slot, that a potential value of the "Doctor" entity slot is "Dr. John Burke," and that "Dr. Burke" and "Dr. John Burke" are synonyms, and the slot filling engine 306 and natural language processing use the value and/or synonyms to identify the entity being referred to, i.e., the "Doctor" in this example. In one embodiment, the user 112n provides a set of synonyms during development and the system 100 may modify the set of synonyms during production based on machine learning the input received from users (e.g. user 112a) in production.

In one embodiment, a regex lookup strategy is used if an entity has a distinctive pattern. Examples may include, but are not limited to, a social security number, a car registration number, a patient or account number, a credit card number, etc. In some embodiments, the pattern may be defined, via the conversation definition engine 302, during development (e.g. using the declarative framework). For example, during development the conversation definition engine 302 receives input from a user 112n indicating that regex lookup strategy is to be used for an "Email" entity slot, that a pattern of the "Email" entity slot is a string of characters, the @ symbol, another string of characters, a period, and a string of two or three characters, and the slot filling engine 306 and natural language processing use the pattern to identify an e-mail address.

In some embodiments, the slot filling engine 306 uses a non-linear slot-filling algorithm, which is capable of obtaining and filling the slots associated with a conversation in different orders (e.g. any order), thereby enabling the chatbot to obtain and request information in whatever order user 112a chooses to supply information or in whatever order the conversation prompt engine 308 prompts the user for information.

In some embodiments, the slot filling engine 306 attempts to pre-fill one or more slots. In some embodiments, the slot filling engine 306 attempts to pre-fill the one or more slots based on a profile associated with user 112a, which is stored in "long term" memory (e.g. a portion of memory 204). In some embodiments, the profile associated with user 112a includes one or more of user 112a's preference data and user 112a's previous chatbot interactions. For example, assume user 112a has requested to schedule a new appointment for February 8th; in one embodiment, the slot filling engine 306 identifies user 112a, accesses a profile associated with user 112a, determines that user 112a's last appointment was with Dr. A, and, via the conversation prompt engine 308, requests that user 112a confirm that he/she would like the new appointment with Dr. A.

In one embodiment, when a user 112a responds negatively to a confirmation of a prefilled slot (e.g. conversation prompt engine 308 prompts user 112a to confirm that the new appointment should be made with Dr. A and the user says "no"), the slot filling engine 306 will not attempt to prefill the slot with (e.g. with "Dr. A") in the future and uses a different prompt (e.g. a request prompt such as "Which doctor would you like to see?") to obtain information for that slot the next time user 112a schedules an appointment.

The slot filling engine 306 fills slots with information provide (or confirmed by user 112a) and determines which slots are unfilled (also occasionally referred to herein as "empty") or unconfirmed. In one embodiment, the slot filling engine 306 passes an identification of the one or more slots that remain unfilled or unconfirmed to the conversation prompt engine 308. In one embodiment, the slot filling engine 306 stores the identification of the one or more slots that remain unfilled or unconfirmed in memory 204 (or any other non-transitory storage medium communicatively accessible). The other engines of the cognitive flow engine 124 including, e.g., the slot filling engine 306, may retrieve the identification of the one or more slots that remain unfilled or unconfirmed by accessing the memory 204 (or other non-transitory storage medium).

The conversation prompt engine 308 includes code for determining a prompt and sending the prompt. As discussed above with reference to the conversation definition engine 302, there are different types of prompts including reactions and requests. Prompts may be sent for presentation to user (e.g. user 112a) or another entity (e.g. in the case of a validation) depending on the embodiment and the type of prompt or nature of the prompt itself.

In some embodiments, the prompt is based on a prompt provided by the developer (e.g. user 112n) via the conversation definition engine 302 during development. For example, the developer may pre-program the prompt "Which provider would you like to see?" as the prompt for a "doctor" slot. In some embodiments, the prompt is dynamically generated. For example, the conversation prompt engine 308 determines what slot associated information was extracted from the user's last input and generates a prompt that acknowledges the receipt of that information. For example, "I have the following appointment times for Dr. A Smith this coming Tuesday" is dynamically generated responsive to receiving Dr. A. Smith for a "Doctor" slot and Tuesday for a "date" slot from a user's input.

In one embodiment, when multiple slots are empty, the conversation prompt engine 308 uses predictive analytics to determine which prompt to send and/or which slot to attempt to fill next. Depending on the embodiment, the predictive analytics may be based on all customers/end users, individually based on a particular user (e.g. the current user, user 112a), or a combination of both. For example, the conversation prompt engine 308 may determine to prompt user 112a for a doctor name since users generally prefer to see specific doctors. In another example, the conversation prompt engine 308 may determine to prompt user 112a for a time of day because user 112a prefers to be seen at a time that suits his/her schedule more than he/she prefers a specific doctor.

The conversation prompt engine 308 generates presentation information for delivering the prompt. The type of presentation information may depend on the embodiment. In one embodiment, the chatbot uses audio communication to interact with user 112a and the slot filling engine 306 may include an automatic speech recognition component (for converting user input such as user 112a's speech to text) and the conversation prompt engine 308 may include a text to talk component (for converting a prompt, verification or other output from the chatbot into an audio output presented to the user 112a). In one embodiment, the chatbot uses visual communication (e.g. text) and may omit automatic speech recognition and text to talk components and visual output the prompt to the user 112a, e.g., in text.

In one embodiment, the slot filling engine 306 passes the one or more filled slots to the action implementation engine 310. In one embodiment, the slot filling engine 306 stores one or more filled slots in memory 204 (or any other non-transitory storage medium communicatively accessible). The other engines of the cognitive flow engine 124 including, e.g., the action implementation engine 310, may retrieve the one or more filled slots by accessing the memory 204 (or other non-transitory storage medium).

The action implementation engine 310 includes code and routines for performing an action associated with the conversation. For example, the action implementation engine 310 may add an appointment to a calendar or interact with a calendaring application to add the appointment based on the slots filled in a "Schedule Appointment" conversation between user 112a and the chatbot.

Example Methods

Figure 4:
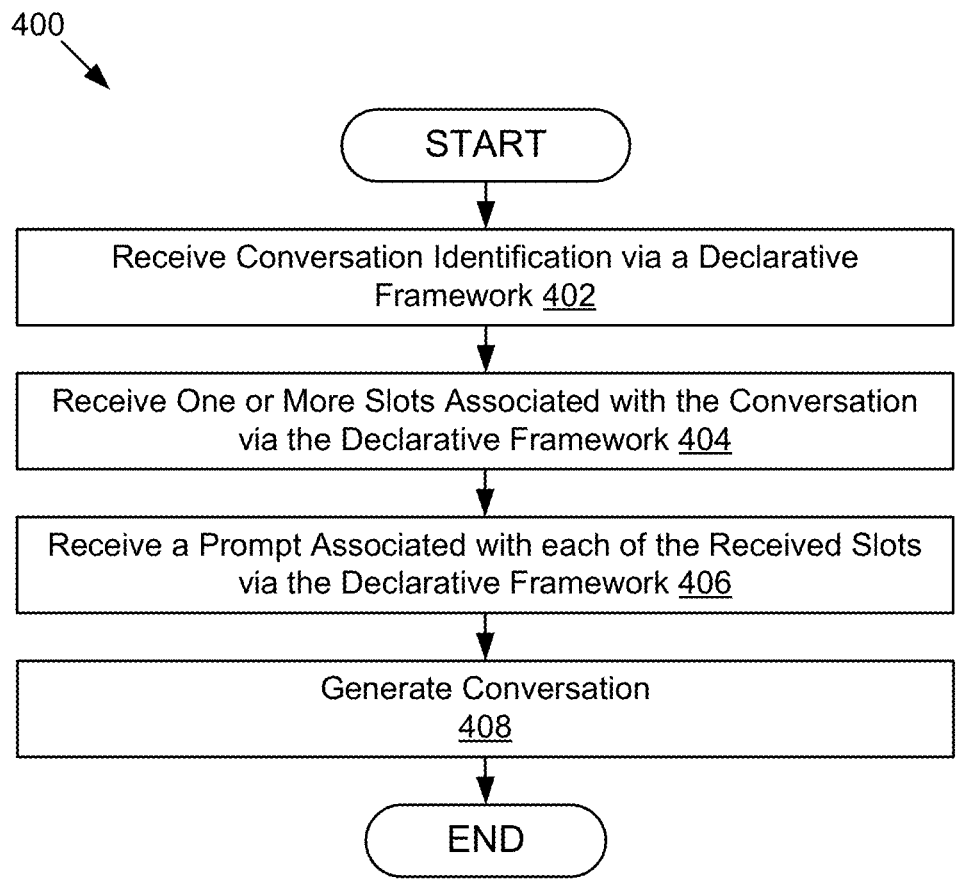
FIG. 4 is a flowchart of an example method for creating a cognitive flow chatbot according to one embodiment.
Figure 5:
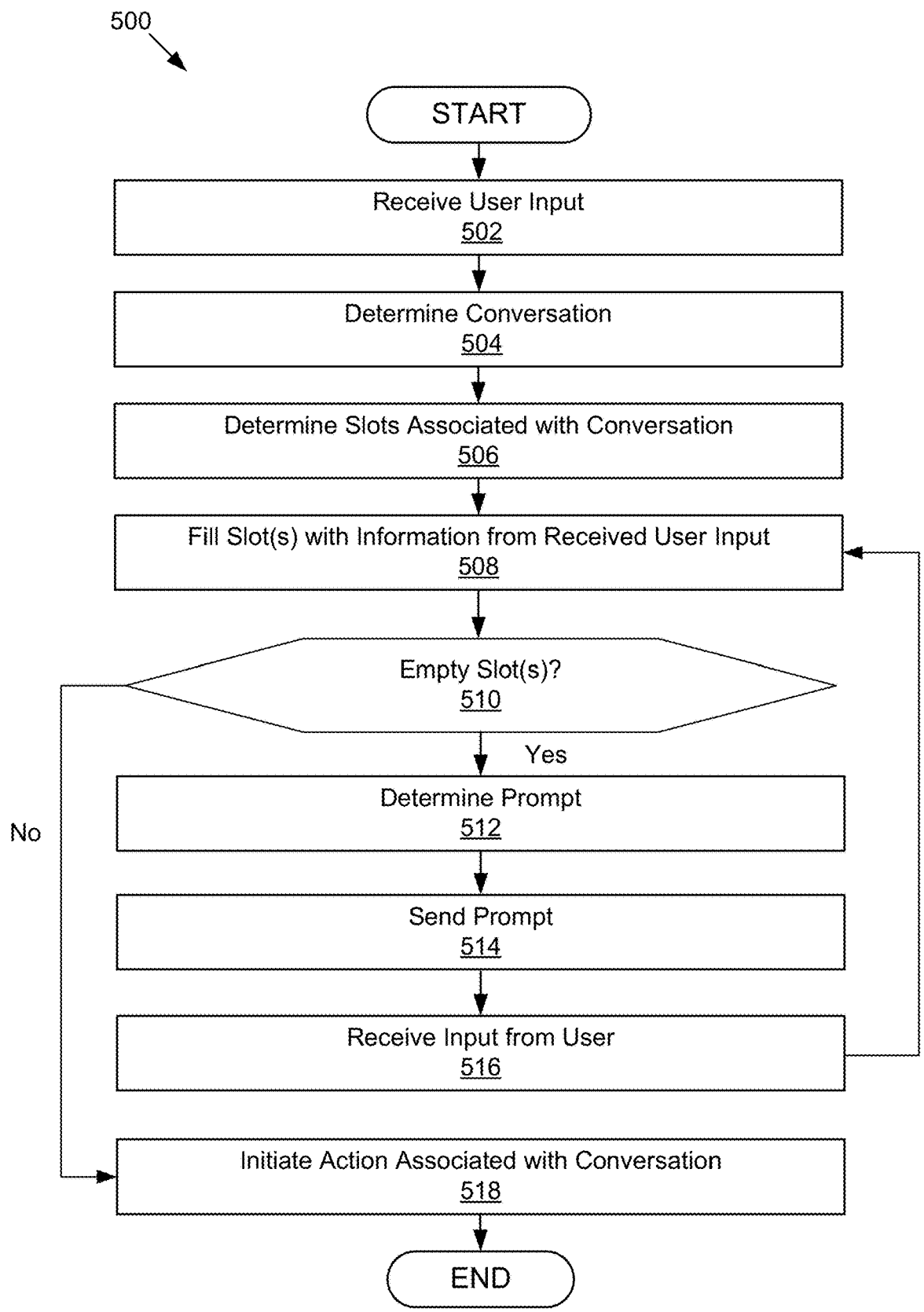
FIG. 5 is a flowchart of an example method for conversing with a human user using the cognitive flow chatbot according to one embodiment.

FIGS. 4 and 5 are flowcharts illustrating example methods that may be performed by the systems described in FIG. 1-3 or 6. Referring to FIG. 4, an example method 400 for creating a cognitive flow chatbot according to one embodiment is shown. At block 402, the conversation definition engine 302 receives a conversation identification via a declarative framework. At block 404, the conversation definition engine 302 receives, via the declarative framework, one or more slots associated with the conversation received at block 402. At block 406, the conversation definition engine 302 receives, via the declarative framework, a prompt associated with each of the one or more slots received at block 404. At block 408, the conversation definition engine 302 generates a chatbot conversation capable of conversing with a human in the conversation(s) as defined in blocks 402, 404 and 406.

FIG. 5 is a flowchart of an example method for conversing with a human user using the cognitive flow chatbot according to one embodiment. At block 502, the slot filling engine 306 receives user input. At block 504, the slot filling engine 306 determines a conversation based on the user input received at block 502. At block 506, the slot filling engine 306 determines the one or more slots associated with the conversation determined at block 504. At block 508, the slot filling engine 306 fills slot(s) with any relevant information from the user input received at block 508. At block 510, the conversation prompt engine 308 determines if there are any empty slot(s).

If there are empty slots (510—Yes), the conversation prompt engine 308 determines, at block 512, a prompt for a missing slot, and sends, at block 514, the prompt for the missing slot. At block 518, the slot filling engine 306 receives user input responding to the prompt sent at block 514, and, at block 508, fills the slot(s) with relevant information received at block 518. Blocks 510, 512, 514, 516, 518 and 508 may be repeated until it is determined that no slots are empty/unfilled (510—No), at which time the method 500 proceeds to block 520. At block 520, the action implementation engine 310 initiates an action associated with the conversation.

Other Figures

Figure 6:
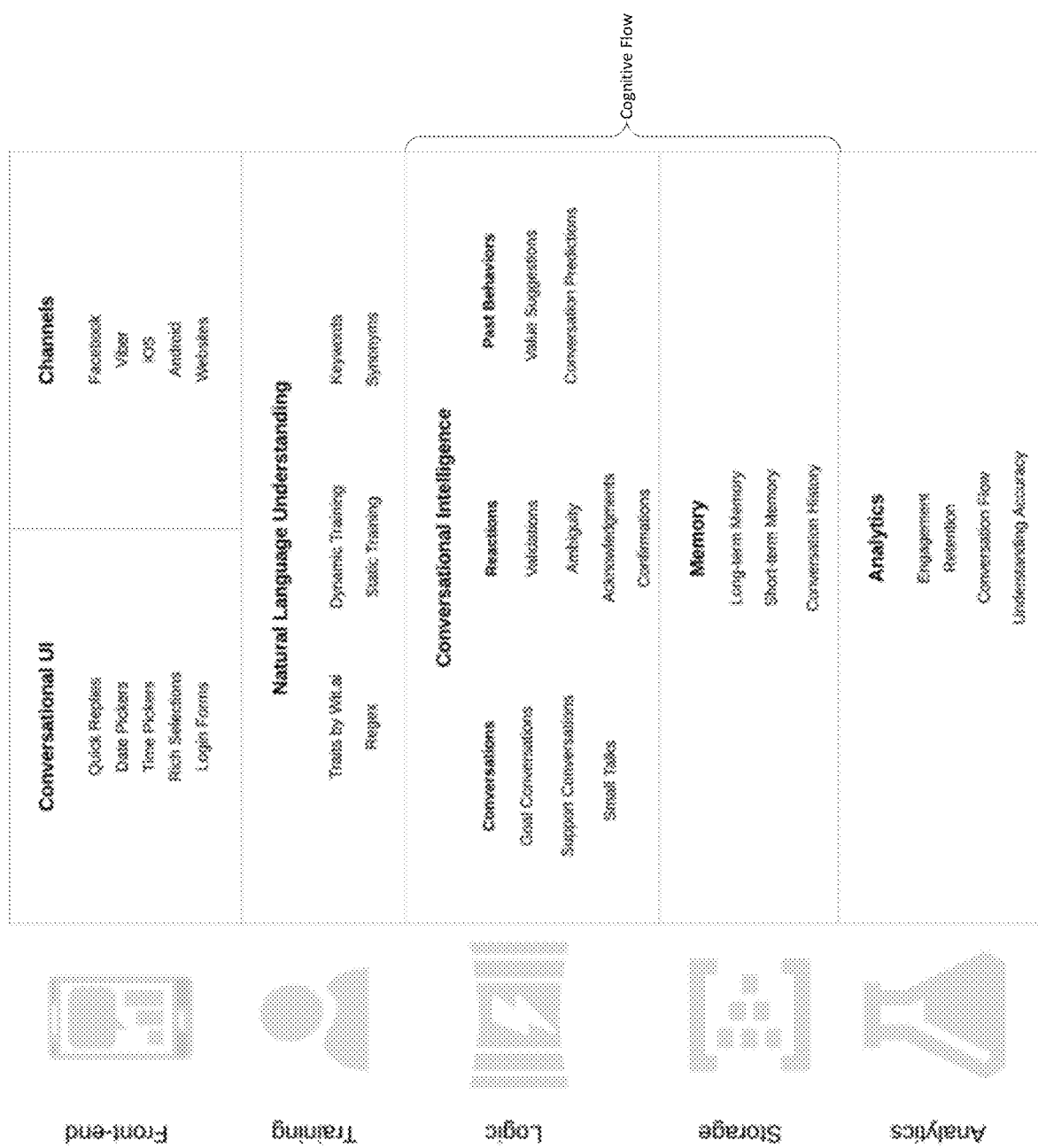
FIG. 6 is a block diagram illustrating an example system architecture according to another embodiment

FIG. 6 is a block diagram illustrating an example system architecture according to another embodiment. In the example system architecture of FIG. 6, it should be recognized that many of the features and functionalities discussed above with regard to the engines of FIG. 3 and the methods of FIGS. 4-5 are represented in the "Logic" and "Storage" portions bracketed as "Cognitive Flow" in FIG. 8.

Figure 7:
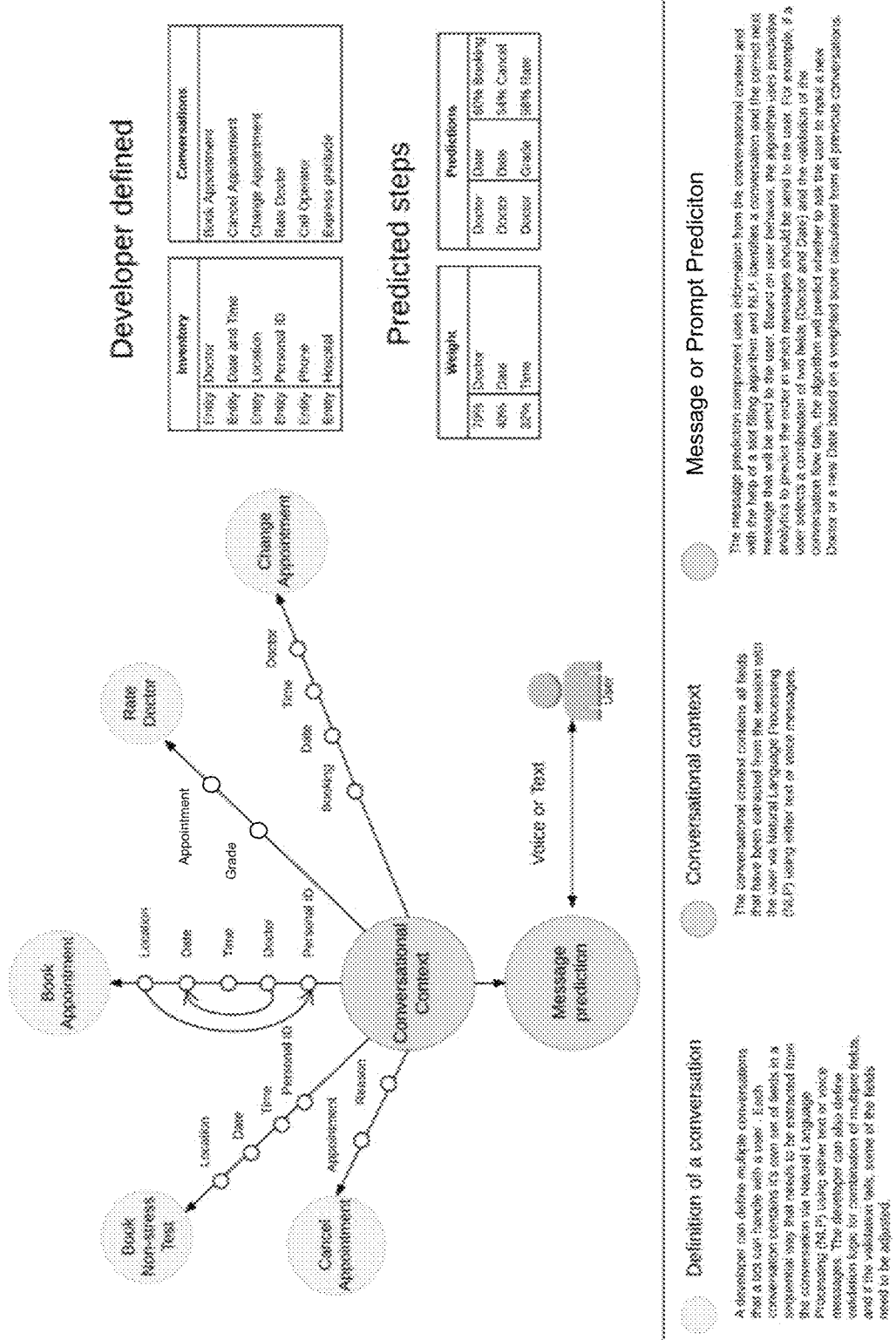
FIG. 7 is a diagram illustrating various features of the system for cognitive flow according to one embodiment.

FIG. 7 is a diagram illustrating various features of the system for cognitive flow according to one embodiment. Illustrated are aspects describing the predictions (e.g. of conversation and what slot to prompt for next), developer defined conversations and an inventory of slots as well as other aspects present in some embodiments.

Other Considerations

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one embodiment," "an embodiment," "one implementation" or "an implementation" means that a particular feature, structure, or characteristic described in connection with the embodiment is included in at least one embodiment. The appearances of the phrase "in one embodiment" in various places in the specification are not necessarily all referring to the same embodiment.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc.

Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web-Socket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not limited to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, engines, routines, features, attributes, methodologies and other aspects are not mandatory or significant, and the mechanisms that implement the specification or its features may have different names, divisions and/or formats.

Furthermore, the modules, engines, routines, features, attributes, methodologies and other aspects of the disclosure can be implemented as software, hardware, firmware, or any combination of the foregoing. Also, wherever a component, an example of which is a engine, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
   receiving, using one or more processors, a first input from a user;
   determining, using the one or more processors, a first set of slots filled based on the first input using natural language processing and a non-linear slot filling algorithm;
   determining, using the one or more processors, a first conversation based on the first set of slots filled, wherein the first set of slots is common to a plurality of conversations and determining the first conversation is based on predictive analytics, wherein the predictive analytics is based on one or more of the user's individual history and a collective user history, wherein the first conversation is associated with a plurality of slots including the first set of slots and a first empty slot;
   determining, using the one or more processors, the first empty slot associated with the first conversation;
   prompting, using the one or more processors, the user for a second input, wherein the second input is associated with the first empty slot;
   filling, using the one or more processors, the first empty slot using the natural language processing and the non-linear slot filling algorithm;
   determining, using the one or more processors, that the plurality of slots associated with the first conversation are filled; and
   responsive to determining that the plurality of slots associated with the first conversation are filled, initiating, using the one or more processors, an action associated with the conversation.

2. The method of claim 1, wherein the first input is one or more of a first audio input received via a microphone and a first textual input, and wherein the second input is one or more of a second audio input and a second textual input.

3. The method of claim 1, further comprising:
   determining a second empty slot associated with the first conversation; and
   wherein the user is prompted for the second input associated with the first empty slot prior to being prompted for a third input associated with a second empty slot based on one or more of a predictive analytic and a conditionality defined during development of the first conversation.

4. The method of claim 1, further comprising:
prior to determining that the plurality of slots associated with the first conversation are filled, receiving a third input from the user;
determining that the third input is associated with a second conversation;
storing information that fills slots associated with the first conversation;
switching to the second conversation;
filling a slot associated with the second conversation based on the third input using the natural language processing and the non-linear slot filling algorithm; and
resuming the first conversation by prompting the user for the second input.

5. The method of claim 1, further comprising:
filling a slot associated with the first conversation based on input received from the user in a previous session.

6. The method of claim 1, further comprising:
receiving, during training, via a declarative framework, a name and a look-up strategy, the look-up strategy defining a search strategy of the natural language processing, wherein the look-up strategy is based on a trait; and
receiving, during training, a first set of expressions.

7. The method of claim 1, further comprising:
receiving, during training, via a declarative framework, a name and a look-up strategy, the look-up strategy defining a search strategy of the natural language processing, wherein the look-up strategy is based on a keyword; and
receiving, during training, via a declarative framework, a first set of words identifying a value for a slot associated with the first conversation, wherein the first set of words includes a plurality of synonyms the value.

8. The method of claim 1, further comprising:
receiving, during training, via a declarative framework, a name and a look-up strategy, the look-up strategy defining a search strategy of the natural language processing, wherein the look-up strategy is based on a regex; and
receiving, during the training, via a declarative framework, a definition of a pattern of a value of a slot associated with the first conversation.

9. A system comprising:
one or more processors; and
a memory storing instructions that, when executed by the one or more processors, cause the system to:
receive a first input from a user;
determine a first set of slots filled based on the first input using natural language processing and a non-linear slot filling algorithm;
determine first conversation based on the first set of slots filled, wherein the first set of slots is common to a plurality of conversations and determining the first conversation is based on predictive analytics, wherein the predictive analytics is based on one or more of the user's individual history and a collective user history, wherein the first conversation is associated with a plurality of slots including the first set of slots and a first empty slot;
determine the first empty slot associated with the first conversation;
prompt the user for a second input, wherein the second input is associated with the first empty slot;
fill the first empty slot using the natural language processing and the non-linear slot filling algorithm;
determine that the plurality of slots associated with the first conversation are filled; and
responsive to determining that the plurality of slots associated with the first conversation are filled, initiate an action associated with the conversation.

10. The system of claim 9, wherein the first input is one or more of a first audio input received via a microphone and a first textual input, and wherein the second input is one or more of a second audio input and a second textual input.

11. The system of claim 9, wherein the instructions, when executed by the one or more processors, further cause the system to:
determine a second empty slot associated with the first conversation; and
wherein the user is prompted for the second input associated with the first empty slot prior to being prompted for a third input associated with a second empty slot based on one or more of a predictive analytic and a conditionality defined during development of the first conversation.

12. The system of claim 9, wherein the instructions, when executed by the one or more processors, further cause the system to:
prior to determining that the plurality of slots associated with the first conversation are filled, receive a third input from the user;
determine that the third input is associated with a second conversation;
store information that fills slots associated with the first conversation;
switch to the second conversation;
fill a slot associated with the second conversation based on the third input using the natural language processing and the non-linear slot filling algorithm; and
resume the first conversation by prompting the user for the second input.

13. The system of claim 9, wherein the instructions, when executed by the one or more processors, further cause the system to:
fill a slot associated with the first conversation based on input received from the user in a previous session.

14. The system of claim 9, wherein the instructions, when executed by the one or more processors, further cause the system to:
receive, during training, via a declarative framework, a name and a look-up strategy, the look-up strategy defining a search strategy of the natural language processing, wherein the look-up strategy is based on a trait; and
receive, during training, a first set of expressions.

15. The system of claim 9, wherein the instructions, when executed by the one or more processors, further cause the system to:
receive, during training, via a declarative framework, a name and a look-up strategy, the look-up strategy defining a search strategy of the natural language processing, wherein the look-up strategy is based on a keyword; and
receive, during training, via a declarative framework, a first set of words identifying a value for a slot associated with the first conversation, wherein the first set of words includes a plurality of synonyms the value.

16. The system of claim 9, wherein the instructions, when executed by the one or more processors, further cause the system to:
receive, during training, via a declarative framework, a name and a look-up strategy, the look-up strategy defining a search strategy of the natural language processing, wherein the look-up strategy is based on a regex; and receive, during the training, via a declarative framework, a definition of a pattern of a value of a slot associated with the first conversation.

\* \* \* \* \*